United States Patent
Asoma

(10) Patent No.: US 8,063,946 B2
(45) Date of Patent: Nov. 22, 2011

(54) SHORT EXPOSURE TIME WHICH IS COMBINED WITH A LONG EXPOSURE TIME IN ACCCORDANCE WITH A SCENE CHANGE

(75) Inventor: Akira Asoma, Kanagawa (JP)

(73) Assignee: Sony Corporation, Tokyo (JP)

( * ) Notice: Subject to any disclaimer, the term of this patent is extended or adjusted under 35 U.S.C. 154(b) by 304 days.

(21) Appl. No.: 12/195,493

(22) Filed: Aug. 21, 2008

(65) Prior Publication Data

US 2009/0086085 A1    Apr. 2, 2009

(30) Foreign Application Priority Data

Sep. 28, 2007   (JP) ................................ 2007-255209

(51) Int. Cl.
   *H04N 5/235*    (2006.01)
(52) U.S. Cl. ..................... 348/222.1; 348/362
(58) Field of Classification Search ............... 348/221.1, 348/223.1, 227.1, 228.1, 229.1, 362, 361
   See application file for complete search history.

(56) References Cited

U.S. PATENT DOCUMENTS

| | | | |
|---|---|---|---|
| 5,194,960 A | | 3/1993 | Ota |
| 5,455,621 A | | 10/1995 | Morimura |
| 6,670,993 B1 * | | 12/2003 | Yamamoto et al. ............ 348/362 |
| 2004/0218830 A1 | | 11/2004 | Kang et al. |
| 2005/0264682 A1 | | 12/2005 | Kurane |
| 2006/0033823 A1 | | 2/2006 | Okamura |
| 2006/0279639 A1 * | | 12/2006 | Silverstein et al. ...... 348/208.14 |
| 2007/0146538 A1 * | | 6/2007 | Kakinuma et al. ............ 348/362 |
| 2008/0266424 A1 | | 10/2008 | Asoma |

FOREIGN PATENT DOCUMENTS

| | | |
|---|---|---|
| EP | 0 930 780 A1 | 7/1999 |
| JP | 6-141229 | 5/1994 |
| JP | 10-23324 | 1/1998 |
| JP | 10-164420 | 6/1998 |
| JP | 2001-24939 | 1/2001 |
| JP | 2002-84449 | 3/2002 |
| JP | 2002-101347 | 4/2002 |
| JP | 2004-120205 | 4/2004 |
| JP | 2006-148353 | 6/2006 |

OTHER PUBLICATIONS

U.S. Appl. No. 12/509,741, filed Jul. 27, 2009, Asoma.
U.S. Appl. No. 12/015,815, filed Jan. 17, 2008, Asoma.
U.S. Appl. No. 12/190,800, filed Aug. 13, 2008, Asoma.
U.S. Appl. No. 12/188,580, filed Aug. 8, 2008, Asoma.

* cited by examiner

*Primary Examiner* — Nelson D. Hernández Hernández
(74) *Attorney, Agent, or Firm* — Oblon, Spivak, McClelland, Maier & Neustadt, L.L.P.

(57) ABSTRACT

An image pickup apparatus includes an image pickup unit configured to output a long-exposure image signal with a relatively long exposure time and a short-exposure image signal with a relatively short exposure time; a signal processing unit configured to generate a combined image signal with a relatively wide dynamic range at least wider than that of the long-exposure image signal or that of the short-exposure image signal by combining the long-exposure image signal and the short-exposure image signal; a detection unit configured to generate a luminance integrated value of the combined image signal; and a control unit configured to perform exposure correction control using the luminance integrated value. The control unit initializes a correction value for use in the exposure correction control during a scene change.

12 Claims, 15 Drawing Sheets

SHORT EXPOSURE TIME WHICH IS COMBINED WITH A LONG EXPOSURE TIME IN ACCCORDANCE WITH A SCENE CHANGE

CROSS REFERENCES TO RELATED APPLICATIONS

The present invention contains subject matter related to Japanese Patent Application JP 2007-255209 filed in the Japanese Patent Office on Sep. 28, 2007, the entire contents of which are incorporated herein by reference.

BACKGROUND OF THE INVENTION

1. Field of the Invention

The present invention relates to an image pickup apparatus, an image pickup method, and a program therefor for generating a combined image signal with a wide dynamic range by combining a long-exposure image signal and a short-exposure image signal.

2. Description of the Related Art

In image pickup apparatuses using a solid-state image pickup device such as a charge coupled device (CCD), the quantity of light to be input into the image pickup device (light quantity of exposure) is adjusted by controlling an aperture and an electronic shutter speed. That is, the light quantity of exposure is adjusted when images are captured. More specifically, a bright scene is captured with a reduced light quantity of exposure so as to avoid overexposure caused by saturation of a signal output from the image pickup device. Conversely, a dark scene is captured with an increased light quantity of exposure so as to avoid underexposure of such an output signal.

However, when a scene with a strong contrast is desired to be captured (for example, image capturing of a backlit subject or simultaneous image capturing of an indoor scene and an outdoor scene) using a solid-state image pickup device with an insufficient dynamic range, even if the light quantity of exposure is adjusted, overexposure may occur in a bright portion of the scene due to the saturation of the bright portion and underexposure may occur in a dark portion of the scene. As a result, both of these portions are not appropriately reproduced.

As a method of overcoming such a difficulty, for example, Japanese Unexamined Patent Application Publication No. 6-141229 and its corresponding U.S. Pat. No. 5,455,621 disclose a method of separately obtaining bright area information and dark area information by using two different electronic shutter speeds in a field or changing the electronic shutter speed on a field-by-field basis, and combining the obtained items of information into a single image.

This method is employed by apparatuses capable of capturing an image with a wide dynamic range (wide dynamic range cameras). Japanese Unexamined Patent Application Publication Nos. 2002-84449 and 2004-120205 (corresponding US Published Application 2006/0033823 A1) disclose apparatuses and methods for improving the quality of the above-described combined image.

Wide dynamic range cameras generally have two types of image capturing modes, a combined image capturing mode in which wide dynamic range image capturing is performed and a normal image capturing mode in which no wide dynamic range image capturing is performed. In many cases, monitoring cameras are constantly operated in the combined image capturing mode. This is primarily because, for the role of a camera to monitor a wide area by automatically or manually rotating the camera itself, there are places where a wide dynamic range is indispensable and places where such a wide dynamic range is not indispensable, and because this indispensability may change with time. Thus, it is difficult to predict which image capturing mode is more appropriate. The image capturing mode can be switched automatically or manually in accordance with the state of a subject. However, this results in a problem that the quality of a moving image is degraded because an output video image signal suddenly changes when a signal processing algorithm is switched in accordance with the image capturing mode.

In the case of a monitoring camera that monitors a wide area, it is assumed that the luminance of a subject greatly varies from one monitoring area to another. It is thus more preferable to continue the combined image capturing mode than causing changes in a video image due to frequent changes in the image capturing mode for each monitoring area.

Further, the monitoring camera is requested to capture both a scene with a strong contrast (e.g., image capturing of a backlit subject or simultaneous image capturing of an indoor scene and an outdoor scene) where combined image capturing is necessary and a scene with a weak contrast for which the combined image capturing is not necessary (a scene suitably captured in the normal image capturing mode) in the combined image capturing mode. The monitoring camera is requested to capture high-quality images of both scenes.

SUMMARY OF THE INVENTION

Referring to FIG. 19, a monitoring camera 100 provided in a room is requested to capture an image of a subject 102 positioned outside a doorway 101 in a backlit state. There are a place where a wide dynamic range is indispensable and a place where such a wide dynamic range is not indispensable, that is, a bright area 104 where the sunlight shines through a windowpane 103 and a dark area 105 at a corner of the room where the sunlight does not reach. This indispensability may change with time.

The foregoing monitoring camera 100 is an image pickup system operated in the following conditions:

(1) the monitoring camera 100 is constantly operated in the combined image capturing mode;

(2) the image capturing mode is switched by automatically or manually rotating (panning and tilting) the monitoring camera 100 from a monitoring area in the A direction (back-lit area) where simultaneous image capturing of an indoor scene and an outdoor scene is performed to a monitoring area in the B direction (front-lit area) where image capturing of an indoor scene is performed;

(3) exposure is already completed in the A direction, and an optimal combined image is obtained; and (4) the combined image capturing mode involves a relatively longer exposure time than that in the normal image capturing mode.

With the effects of the combined image capturing mode, the image capturing state is changed from a backlit state in the A direction where underexposure/overexposure correction is performed to a state in the B direction in which such correction is not necessary. When image capturing begins in the B direction, the amount of correction is reduced step by step. Therefore, the combined image capturing mode involves a longer time than the normal image capturing mode to recover an appropriate exposure state in which no correction is performed. For example, an exposure process converges within about two seconds in the normal image capturing mode; it takes about fifteen seconds in the combined image capturing mode. This is because of the characteristics of exposure control in the combined image capturing mode. Feedback control is performed by correcting underexposure/overexposure step by step and referring to changes in a histogram and luminance of a combined image along with the underexposure/overexposure correction. This is also to make changes in luminance of the combined image more gradual.

However, the correction functioning in the image capturing state in the A direction is also active when the state is changed to the image capturing state in the B direction. When monitoring in the B direction begins, the unnecessary correction in the A direction is also active, thus outputting a video image deviating from an appropriate luminance level. It also takes a long time for the video image to become appropriately exposed. Therefore, there are problems that the image quality is poor, and exposure is slow.

It is desirable to provide an image pickup apparatus, an image pickup method, and a program therefor for completing, in a wide-area monitoring camera system which is necessary to be constantly operated in a combined image capturing mode of a wide dynamic range camera, when a monitoring area changes from a state in which exposure is completed in a backlit state to a front-lit state, exposure within a time equivalent to that in a normal image capturing mode without activating correction functioning in the backlit state.

Embodiments of the present invention and specific advantages thereof will be made clear from the following description.

The present invention shortens the exposure time in the combined image capturing mode by paying attention to the following points:

(1) rotation (panning/tilting) of a camera can be used to trigger a scene change;

(2) since a user desires to have an appropriate exposure state when the camera is still in each monitoring area, the exposure state when the camera is being rotated (panned/tilted) is not regarded as a problem; and (3) during a process in which an uncorrected image is corrected step by step, the quality of the image is not determined poor since the exposure being performed does not deviate greatly from appropriate exposure.

By taking into consideration the points (1) and (2), the exposure processing time can be reduced by receiving a signal for initializing a correction value, which is from an external apparatus, such as a control unit that performs panning/tilting, and which triggers a scene change, performing correction value initialization while the camera is being rotated, and starting a correction process in a new monitoring area from an initial state (no underexposure/overexposure correction is active).

That is, according to an embodiment of the present invention, there is provided an image pickup apparatus including the following elements: an image pickup unit configured to output a long-exposure image signal with a relatively long exposure time and a short-exposure image signal with a relatively short exposure time; a signal processing unit configured to generate a combined image signal with a relatively wide dynamic range at least wider than that of the long-exposure image signal or that of the short-exposure image signal by combining the long-exposure image signal and the short-exposure image signal; a detection unit configured to generate a luminance integrated value of the combined image signal; and a control unit configured to perform exposure correction control using the luminance integrated value. The control unit initializes a correction value for use in the exposure correction control during a scene change.

The detection unit may generate the luminance integrated value and a luminance histogram of the combined image signal. The control unit may perform the exposure correction control using the luminance integrated value and the luminance histogram.

The control unit may perform, during the scene change, an initialization process of minimizing a target luminance integrated value, which is a correction value used in performing underexposure correction and which is used in the exposure correction control.

The control unit may perform an initialization process of maximizing a target short exposure time, which is a correction value used in performing overexposure correction and which is used in the exposure correction control.

The control unit may initialize the correction value for use in the exposure correction control in accordance with a signal indicating occurrence of a rotation operation.

The control unit may initialize the correction value for use in the exposure correction control in accordance with a signal indicating occurrence of a zoom operation.

The control unit may initialize the correction value for use in the exposure correction control in the case where a change in the luminance integrated value obtained by the detection unit is greater than or equal to a predetermined value.

According to another embodiment of the present invention, there is provided an image pickup method including the steps of outputting a long-exposure image signal with a relatively long exposure time and a short-exposure image signal with a relatively short exposure time; generating a combined image signal with a relatively wide dynamic range at least wider than that of the long-exposure image signal or that of the short-exposure image signal by combining the long-exposure image signal and the short-exposure image signal; generating a luminance integrated value of the combined image signal; and performing exposure correction control using the luminance integrated value. In the exposure correction control performing step, a correction value for use in the exposure correction control is initialized during a scene change.

In the generating step, the luminance integrated value and a luminance histogram of the combined image signal may be generated. In the exposure correction control performing step, the exposure correction control may be performed using the luminance integrated value and the luminance histogram.

In the exposure correction control performing step, an initialization process of minimizing a target luminance integrated value, which is a correction value used in performing underexposure correction and which is used in the exposure correction control, may be performed during the scene change.

In the exposure correction control performing step, an initialization process of maximizing a target short exposure time, which is a correction value used in performing overexposure correction and which is used in the exposure correction control, may be performed during the scene change.

In the exposure correction control performing step, the correction value for use in the exposure correction control may be initialized in accordance with a signal indicating occurrence of a rotation operation.

In the exposure correction control performing step, the correction value for use in the exposure correction control may be initialized in accordance with a signal indicating occurrence of a zoom operation.

In the exposure correction control performing step, the correction value for use in the exposure correction control may be initialized when a change in the luminance integrated value obtained in the generating step is greater than or equal to a predetermined value.

According to another embodiment of the present invention, there is provided a program for causing a computer to execute an image pickup method, the image pickup method including the steps of outputting a long-exposure image signal with a relatively long exposure time and a short-exposure image signal with a relatively short exposure time; generating a combined image signal with a relatively wide dynamic range at least wider than that of the long-exposure image signal or the short-exposure image signal by combining the long-exposure image signal and the short-exposure image signal; generating a luminance integrated value of the combined image signal; and performing exposure correction control using the luminance integrated value. In the exposure correction control performing step, a correction value for use in the exposure correction control is initialized during a scene change.

According to the embodiments of the present invention, in a wide-area monitoring camera system which is necessary to be constantly operated in a combined image capturing mode of a wide dynamic range camera, when a monitoring area changes from a state in which exposure is completed in a backlit state to a front-lit state, exposure can be completed within a time equivalent to that in a normal image capturing mode without activating correction functioning in the backlit state.

In an exemplary operation of automatically traveling through monitoring areas at predetermined time intervals and recording video images of the monitoring areas in a recording device, since the video images are corrected, exposure thereof does not significantly deviate from an appropriate exposure state. Many more video images in an appropriate exposure state can be recorded, which has a profound improving effect.

DESCRIPTION OF THE PREFERRED EMBODIMENTS

Embodiments of the present invention will be described in detail with reference to the drawings. The present invention is not limited to the following examples, and various modifications can be arbitrarily made without departing from the gist of the present invention.

Figure 1:
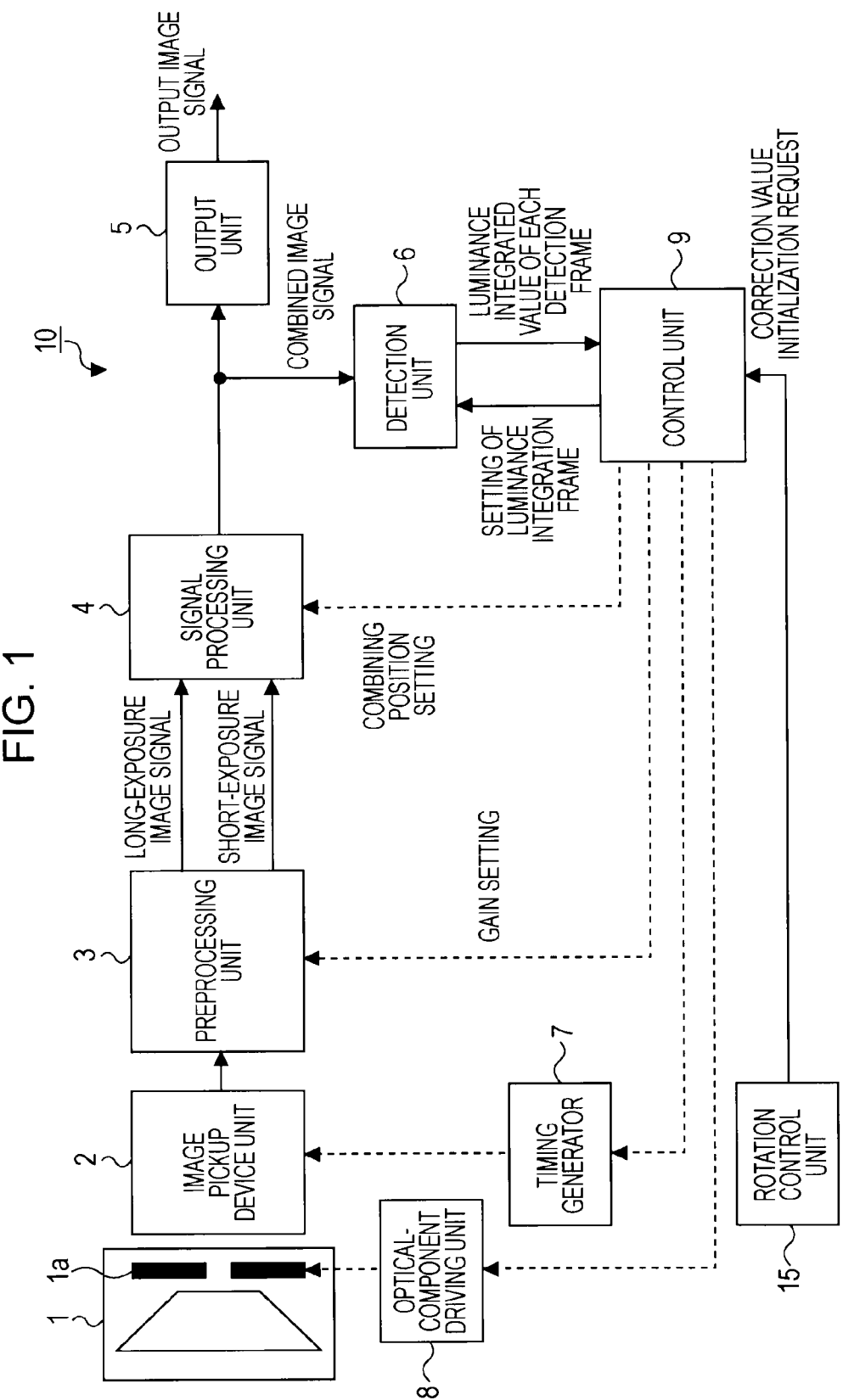
FIG. 1 is a block diagram showing a structure of an image pickup apparatus according to an embodiment of the present invention.

The present invention is applied to, for example, an image pickup apparatus 10 with a structure shown in FIG. 1.

The image pickup apparatus 10 is a monitoring camera rotated (panned and tilted) by a rotation control unit 15 for monitoring a monitoring area. The image pickup apparatus 10 is an image pickup apparatus that can operate in a combined image capturing mode in which the image pickup apparatus 10 operates and captures images as a wide dynamic range camera. Note that the image pickup apparatus 10 may be a digital still camera or a digital video camera (camcorder) normally used by general users.

The image pickup apparatus 10 includes an image pickup optical system 1, an image pickup device unit 2, a preprocessing unit 3, a signal processing unit 4, an output unit 5, a detection unit 6, a timing generator 7, an optical-component driving unit 8, and a control unit 9.

The image pickup optical system 1 includes optical components such as a lens, an optical filter that removes or reduces unnecessary wavelengths, and an aperture 1a. Incident light which has been reflected from a subject is directed via the optical components in the image pickup optical system 1 to the image pickup device unit 2.

Figure 2:
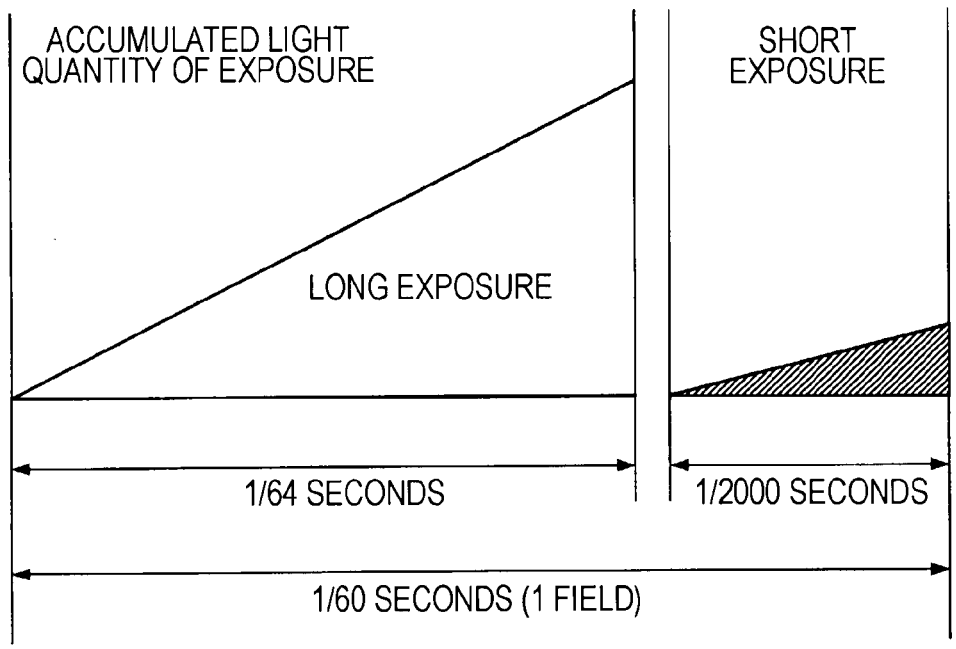
FIG. 2 is an illustration of long exposure and short exposure in the image pickup apparatus.

The image pickup device unit 2 is configured as a solid-state image pickup device, such as a CCD sensor array or a complementary metal oxide semiconductor (CMOS) sensor array. The image pickup device unit 2 performs photoelectric conversion of the light directed via the image pickup optical system 1 and outputs an electric signal serving as a captured image. The image pickup apparatus 10 performs, as shown in FIG. 2, long exposure and short exposure in one field period and outputs electric signals serving as a long-exposure image signal and a short-exposure image signal in a time division manner.

Note that the image pickup device unit 2 is not limited to a structure using a solid-state image pickup device. For example, a non-solid-state image pickup device such as an image pickup tube may be used. For the non-solid-state image pickup device, long exposure and short exposure may be performed and the exposure times of long exposure and short exposure may be made different from each other by using a mechanical shutter or a liquid crystal shutter.

The combined image capturing mode will be described.

In a normal image capturing operation of a generally used image pickup apparatus, it is difficult to handle the dynamic range of a wide area including a very dark portion to a very bright portion of a subject. For example, when an image is to be captured inside a room with a view of an outdoor scene during daytime on a sunny day, if an exposure reference is set to a subject inside the room, the outdoor portion is overexposed because intensity levels are not appropriately allocated thereto. Conversely, when an exposure reference is set to the outdoor portion, the subject inside the room is underexposed. That is, when there is a large difference in luminance of the subject, it is difficult to obtain a captured image corresponding to the dynamic range of that luminance.

In contrast, an image capturing operation in the combined image capturing mode involves a process of changing, for example, the shutter speed of an electronic shutter and combining a plurality of images with different exposure times, whereby a captured image with a wide dynamic range in which overexposure or underexposure does not occur is obtained.

FIG. 2 illustrates exposure times and light quantities of exposure (quantities of electric charge) accumulated in one field in the image pickup device unit 2.

FIG. 2 illustrates the case where $1/64$-second long exposure and $1/2000$-second short exposure are performed in one field period of $1/60$ seconds. The long exposure time and the short exposure time are variable.

By performing long exposure and short exposure, a long-exposure image signal and a short-exposure image signal are obtained in one field period. By combining these two image signals, captured image data of one field is generated.

It is not necessary to perform long exposure and short exposure in one field period. Alternatively, a process of performing long exposure in a certain field period and short exposure in the subsequent field period and combining exposure image signals is also conceivable.

Figure 3:
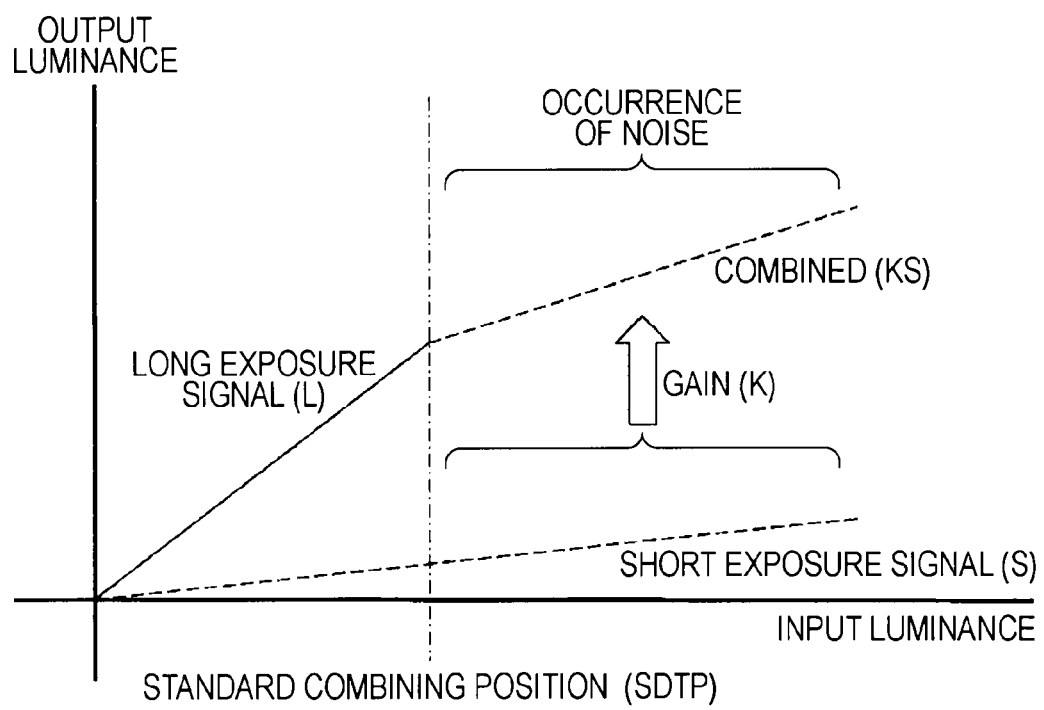
FIG. 3 is an illustration of a combining process performed with the image pickup apparatus.

FIG. 3 illustrates an input/output luminance characteristic L of a long-exposure image signal and an input/output luminance characteristic S of a short-exposure image signal in order to describe a process of combining the long-exposure image signal and the short-exposure image signal.

In the combining process, a combined image is generated by switching images at a switching point indicated by, for example, a luminance threshold. For a pixel with a luminance level lower than that at the switching point, a pixel signal of the long-exposure image signal is adopted. In contrast, for a pixel with a luminance level higher than that at the switching point, a pixel signal of the short-exposure image signal is adopted. Level matching between the two images is performed by multiplying the short-exposure image by an exposure ratio of the long-exposure image to the short-exposure image.

Suppose that the exposure ratio of the long-exposure image to the short-exposure image is 10:1. Then, exposure of the short-exposure image is $1/10$ of the long-exposure image. However, the quantity of existing light is ten times greater than that of the luminance signal level of the short-exposure image signal. Therefore, the levels are matched by multiplying the short-exposure image signal by 10 serving as a gain K.

In this manner, the short-exposure image signal is multiplied by the gain to achieve a characteristic KS in which the level of the input/output luminance characteristic S matches that of the input/output luminance characteristic L, as shown in FIG. 3.

As a result, a combined image with a characteristic L-KS is generated. That is, the combined image is generated as an image where underexposure due to the long-exposure image signal does not occur in a relatively dark area of the subject, and overexposure due to the short-exposure image signal does not occur in a relatively bright area of the subject.

Note that, besides the foregoing method of combining a bright image and a dark image with different exposure times, various methods are available to be employed in the combined image capturing mode in which an output image of a subject with a wide dynamic range including a bright portion to a dark portion is obtained.

For example, there is a method of changing the sensitivity on a pixel-by-pixel basis, extracting only signals under the same exposure condition from an image pickup device, reproducing images, and combining one or more images with different exposure conditions.

There is another method of separating incident light using a prism and combining a signal output from an image pickup device and a signal output from another image pickup device with a dimming function, such as a neutral density (ND) filter for reducing transmitted light beams over the entire wavelength, that is, evenly reducing the quantity of light of incident light beams.

According to the combined image capturing mode using such a method, a dynamic range significantly wider than that in the case of image capturing in the normal image capturing mode can be obtained. Therefore, an output image of a subject with a wide dynamic range including a bright portion to a dark portion can be obtained. This is suitable for capturing images in, for example, rooms lit with strong external light or places with a great luminance difference. More specifically, the combined image capturing mode is preferable when images are captured in the case where the dynamic range changes significantly with time, i.e., daytime and night, such as doorways of stores including banks, traffics in order to check the traffic condition, and the like.

The preprocessing unit 3 included in the image pickup apparatus 10 is a so-called analog front end and performs, on an electric signal serving as a captured image output from the image pickup device unit 2, correlated double sampling (CDS) processing, gain processing using a programmable gain amplifier (PGA), and analog-to-digital conversion processing. The processed long-exposure image signal and short-exposure image signal are supplied to the signal processing unit 4.

The signal processing unit 4 performs the combining process illustrated in FIG. 3 on the input long-exposure image signal and short-exposure image signal. That is, the signal processing unit 4 performs timing adjustment and color balance correction processing on the long-exposure image signal and the short-exposure image signal which are supplied in a time division manner, gain processing of matching the luminance level of the short-exposure image signal to that of the long-exposure image signal, and the combining process. Also, the signal processing unit 4 performs the gamma correction processing and the white balance processing on the combined image signal to generate captured image data.

The signal processing unit 4 outputs the generated captured image data to the output unit 5 and the detection unit 6.

The output unit 5 performs processing on the captured image data from the signal processing unit 4 so as to display an image on a monitor display or to transmit the captured image data to an external apparatus.

The detection unit 6 performs luminance analysis processing on the combined image signal from the signal processing unit 4 to generate information including a luminance integrated value and a luminance histogram and supplies the generated information to the control unit 9.

The control unit 9 is a microcomputer including, for example, a central processing unit (CPU), a read-only memory (ROM), a random access memory (RAM), and a flash memory, and controls the entire operation of the image pickup apparatus 10. The control unit 9 also performs an exposure correction process when capturing images.

The ROM included in the control unit 9 stores an image capturing control program for causing the control unit 9 to execute the above-described control processes. The control unit 9 performs computational and control processing necessary for the foregoing control processes on the basis of the image capturing control program.

The timing generator 7 generates operation pulses necessary for the image pickup device unit 2 including, for example, a CCD sensor array. For example, the timing generator 7 generates various pulses such as a four-phase pulse for vertical transfer, a field shift pulse, a two-phase pulse for horizontal transfer, and a shutter pulse, and supplies these pulses to the image pickup device unit 2. The timing generator 7 can drive the image pickup device unit 2 (electronic shutter function). The timing generator 7 causes the image pickup device unit 2 to perform, as shown in FIG. 2, long exposure with a relatively long exposure time and short exposure with a relatively short exposure time.

The optical-component driving unit 8 drives the optical components included in the image pickup optical system 1 and includes a driving circuit for driving, for example, the aperture 1*a* and a zoom lens.

In the image pickup apparatus 10, the rotation control unit 15 which performs a rotation operation of the image pickup apparatus 10 supplies a signal indicating the occurrence of a rotation operation of the image pickup apparatus 10 to the control unit 9.

Figure 4:
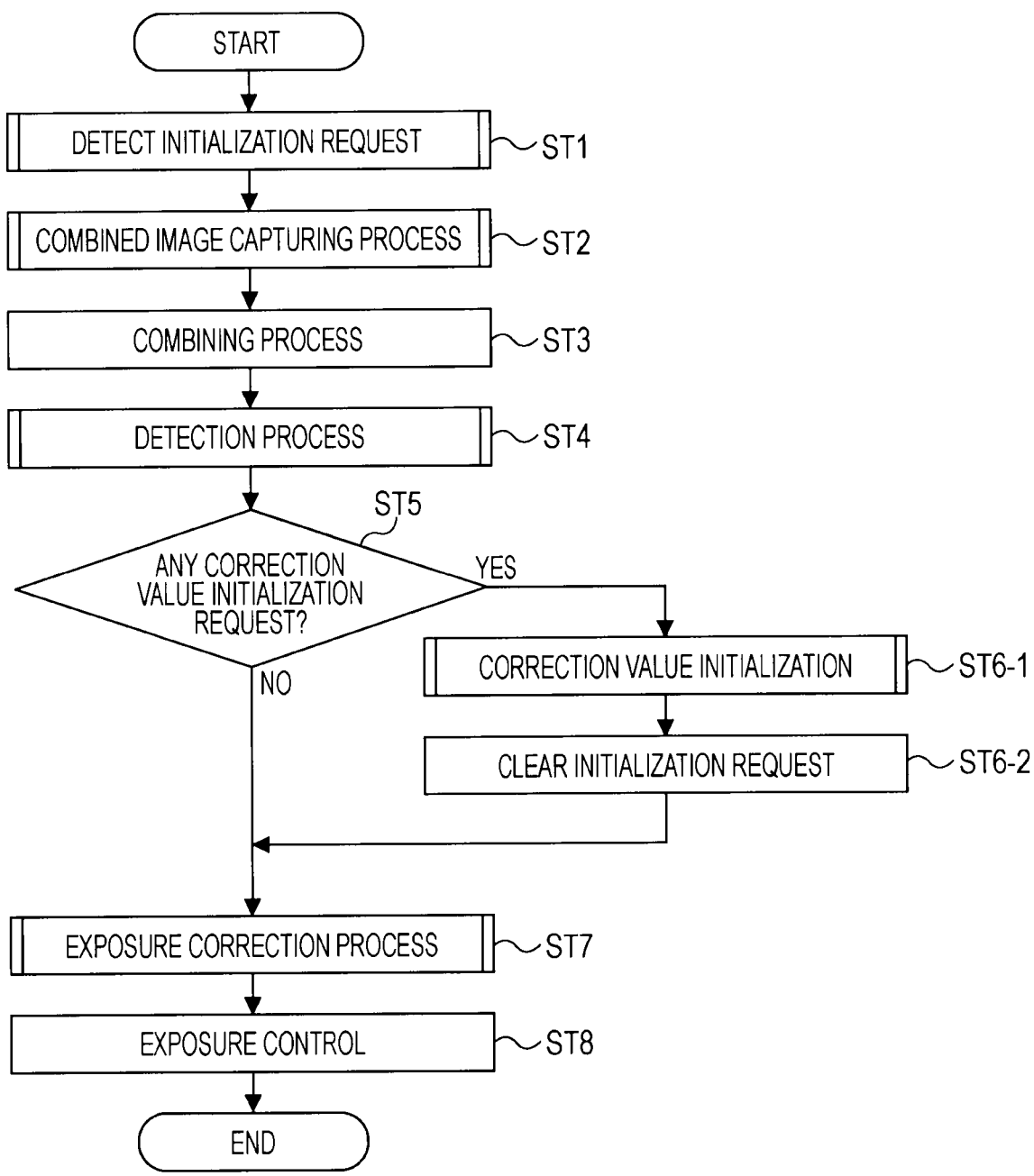
FIG. 4 is a flowchart of the operation of the image pickup apparatus.

Under control of the control unit 9, the image pickup apparatus 10 with the foregoing structure performs an image capturing operation in accordance with the procedure illustrated in the flowchart of FIG. 4.

That is, when the image capturing operation of the image pickup apparatus 10 starts, the control unit 9 performs an initialization request detecting process in step ST1. Thereafter in step ST2, the control unit 9 performs a combined image capturing process.

Figure 5:
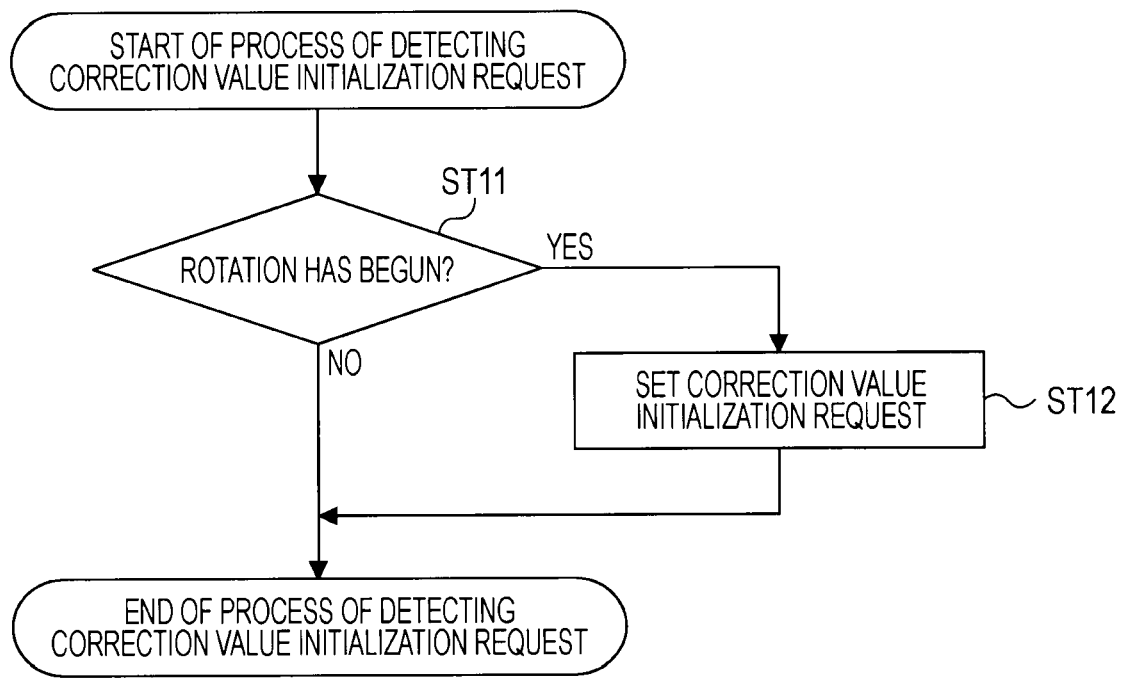
FIG. 5 is a flowchart of a process of detecting a correction value initialization request, which is performed with the image pickup apparatus.

The initialization request detecting process in step ST1 is illustrated in the flowchart of FIG. 5. On the basis of a signal indicating the occurrence of a rotation operation of the image pickup apparatus 10, which is supplied from the rotation control unit 15, the control unit 9 determines whether the rotation has begun (ST11). When the determination result is "yes", that is, when the rotation of the image pickup apparatus 10 has begun, the control unit 9 sets a correction value initialization request (step ST12), and ends the initialization request detecting process. In contrast, when the determination result is "no", that is, when the rotation of the image pickup apparatus 10 has not begun, the control unit 9 ends the initialization request detecting process.

Referring back to FIG. 4, the combined image capturing process in step ST2 controls the driving of the image pickup device unit 2 using the timing generator 7, sets two electronic shutter speeds in the image pickup device unit 2, and performs long exposure and short exposure, as illustrated in FIG. 2. That is, the timing generator 7 can set two different electronic shutter speeds in one field period. In one field period, the image pickup device unit 2 is caused to perform long exposure and short exposure, as illustrated in FIG. 2. Accordingly, two captured image signals with different light quantities of exposure (e.g., a long-exposure image signal with an exposure time of $1/64$ seconds and a short-exposure image signal with an exposure time of $1/2000$ seconds) are obtained. The long-exposure image signal and the short-exposure image signal are processed by the preprocessing unit 3 and supplied to the signal processing unit 4.

In step ST3, the control unit 9 causes the signal processing unit 4 to perform a combining process using the method illustrated in FIG. 3. The signal processing unit 4 combines the long-exposure image signal and the short-exposure image signal, which have been converted to digital signals by using the preprocessing unit 3, to increase the dynamic range thereof and outputs the combined image signal to the output unit 5 and the detection unit 6.

In step ST4, the detection unit 6 performs a detection process.

As has been described above, the combined image signal is also supplied to the detection unit 6. The detection unit 6 generates a luminance integrated value and a luminance histogram of the combined image signal and sends the luminance integrated value and the luminance histogram to the control unit 9 on a field-by-field basis.

Figure 6:
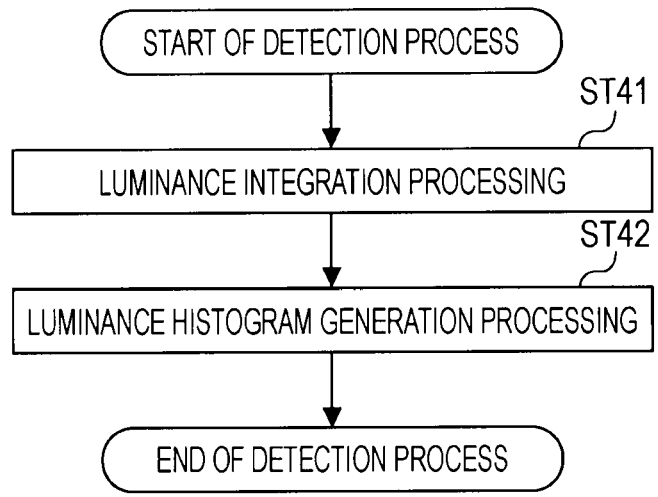
FIG. 6 is a flowchart of a detection process performed with the image pickup apparatus.

The detection process in step ST4 is illustrated in the flowchart of FIG. 6. In step ST41, the luminance of the combined image signal is integrated in one field. In step ST42, a luminance histogram is generated.

Figure 7A:
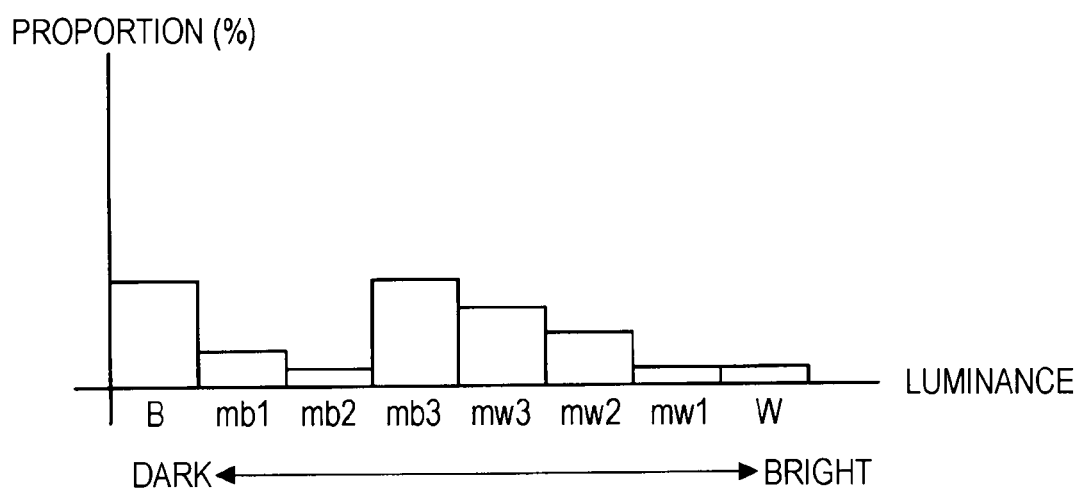
FIGS. 7A and 7B are illustrations of a luminance histogram generated by performing the detection process.
Figure 7B:
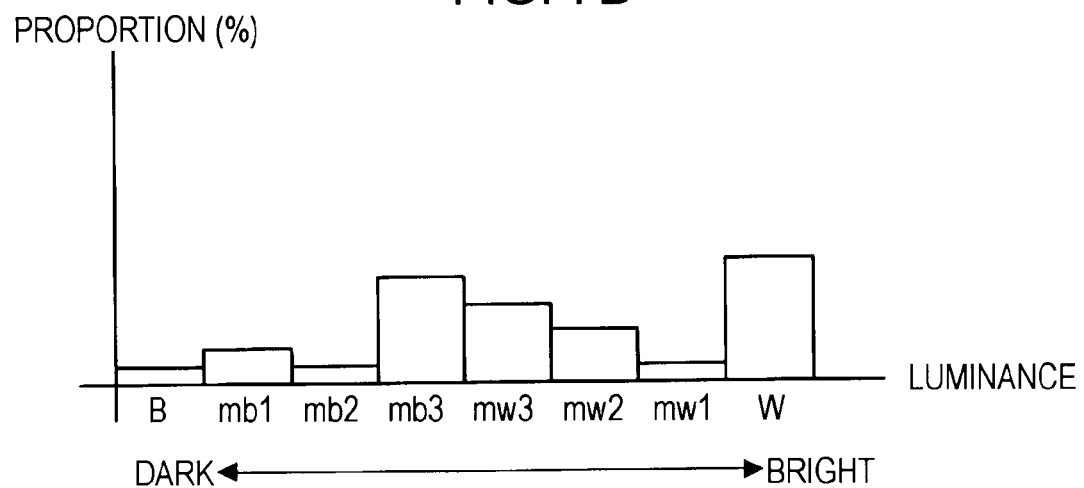

FIGS. 7A and 7B illustrate examples of the luminance histogram. In these examples, the luminance is divided into eight levels from a black level B to a white level W, namely, "B", "mb1", "mb2", "mb3", "mw3", "mw2", "mw1", and "W", and the proportion (%) of the luminance of each of the eight levels in one field image is illustrated.

For example, FIG. 7A shows an example of the luminance histogram in a field of a relatively dark image of the combined image signal. FIG. 7B illustrates an example of the luminance histogram in a field of a relatively bright image.

Referring back to FIG. 4, in step ST5, the control unit 9 determines the presence of a correction value initialization request on the basis of the result of the initialization request detecting process in step ST1.

When the determination result in step ST5 is "yes", that is, when there is a correction value initialization request, the control unit 9 performs a correction value initialization process in step ST6-1 to set correction values for use in exposure correction. In step ST6-2, the control unit 9 clears the initialization request set in step ST12 shown in FIG. 5. The flow proceeds to step ST7, and the control unit 9 performs an exposure correction process.

Figure 8:
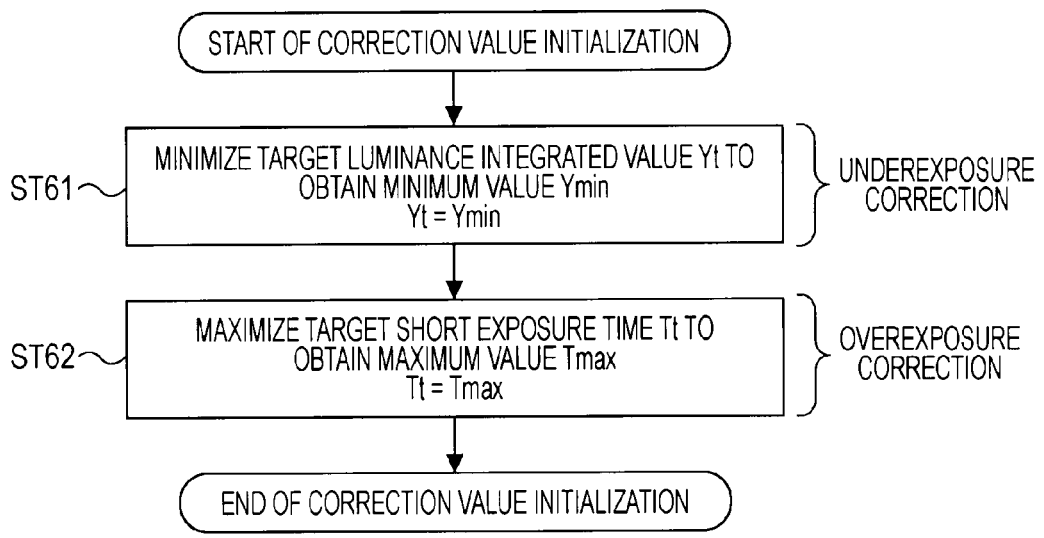
FIG. 8 is a flowchart of an exposure correction value initialization process performed with the image pickup apparatus.

The correction value initialization process in step ST6-1 is illustrated in the flowchart of FIG. 8. In step ST61, a correction value for use in underexposure correction is initialized to minimize a target luminance integrated value Yt which is a correction value for use in underexposure correction, thus obtaining a minimum value Ymin. In step ST62, a correction value for use in overexposure correction is initialized to maximize a target short exposure time Tt which is a correction value for use in overexposure correction, thus obtaining a maximum value Tmax.

Referring back to FIG. 4, when the determination result in step ST5 is "no", that is, when there is no correction value initialization request, the flow proceeds to step ST7 without proceeding to steps ST6-1 and ST6-2, and the control unit 9 performs an exposure correction process.

In the exposure correction process in step ST7, the control unit 9 examines the luminance histogram and determines a target luminance integrated value and a target short exposure time so as to obtain an image in which no underexposure or overexposure is occurring.

In underexposure correction, underexposure is detected by checking the proportion of the black portion (B) in the luminance histogram, and a target luminance integrated value is set so that the black portion (B) has a certain proportion.

In overexposure correction, overexposure is detected by checking the proportion of the white portion (W) in the luminance histogram, and a target short exposure time is set so that the white portion (W) has a certain proportion.

Figure 9:
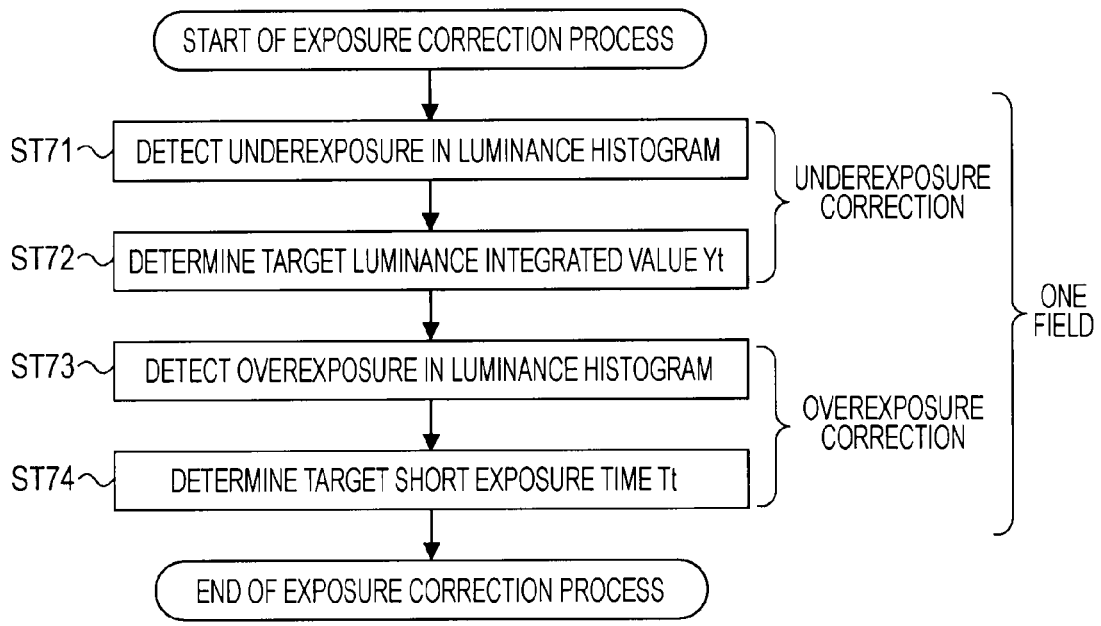
FIG. 9 is a flowchart of an exposure correction process performed with the image pickup apparatus.

The exposure correction process in step ST7 is illustrated in the flowchart of FIG. 9. In step ST71, the control unit 9 detects underexposure by, for example, checking the luminance histogram in one field period. In step ST72, the control unit 9 performs an underexposure correction process to determine the target luminance integrated value Yt. In step ST73, the control unit 9 detects overexposure by checking the luminance histogram. In step ST74, the control unit 9 performs an overexposure correction process to determine the target short exposure time Tt.

Figure 10:
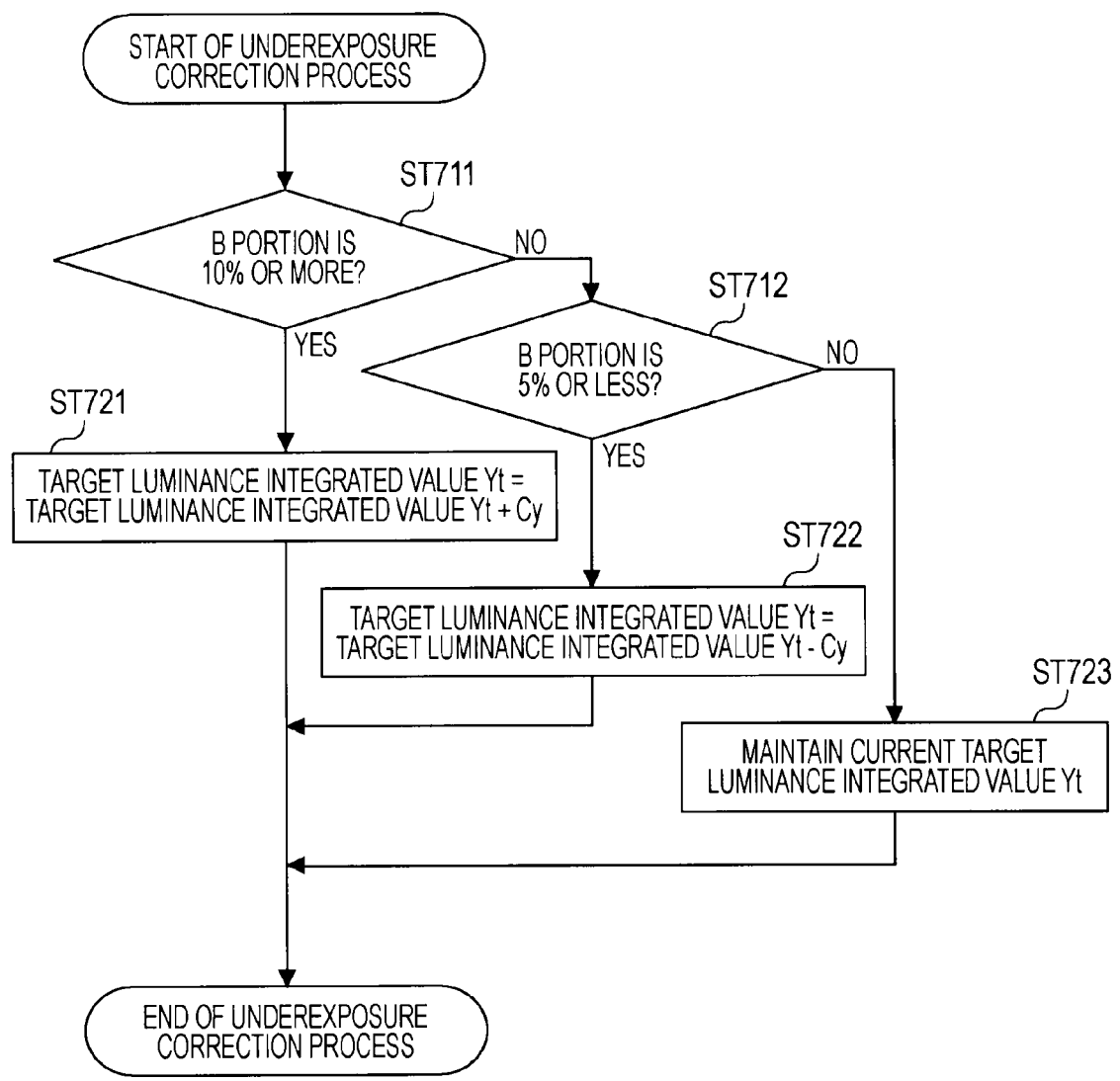
FIG. 10 is a flowchart of an underexposure correction process in the exposure correction process.

The underexposure correction process in steps ST71 and ST72 is illustrated in the flowchart of FIG. 10. Steps ST711 and ST712 are performed as a process of detecting underexposure in the luminance histogram in step ST71. Steps ST721, ST722, and ST723 are performed as a process of determining the target luminance integrated value Yt in step ST72.

That is, in step ST711, the control unit 9 determines whether the proportion of the black portion (B) in the luminance histogram is greater than or equal to 10%. When the proportion is greater than or equal to 10%, it is determined that underexposure is occurring in the combined image signal. In step ST721, the control unit 9 updates the target luminance integrated value Yt to a value obtained by adding a certain fixed value Cy to the current target luminance integrated value Yt. That is, the control unit 9 updates the target luminance integrated value Yt to increase the light quantity of exposure.

When the proportion of the black portion (B) in the luminance histogram is less than 10%, in step ST712, it is determined whether the proportion of the black portion (B) is less than or equal to 5%. When the proportion is less than or equal to 5%, in step ST722, the control unit 9 updates the target luminance integrated value Yt to a value obtained by subtracting the fixed value Cy from the current target luminance integrated value Yt. That is, the control unit 9 updates the target luminance integrated value Yt to reduce the light quantity of exposure.

When it is determined in step ST712 that the proportion is not less than or equal to 5%, that is, when the black portion (B) is within the range between 5% and 10%, it is determined that the light quantity of exposure is appropriate. The flow proceeds to step ST723, and the current target luminance integrated value Yt is maintained as it is.

That is, the underexposure correction process detects underexposure by checking the proportion of the black portion (B) in the luminance histogram and sets the target luminance integrated value Yt so that the black portion (B) has a certain proportion. A new target luminance integrated value Yt is obtained by adding or subtracting the certain value Cy to/from the current target luminance integrated value Yt. The certain value Cy is added or subtracted to obtain a target luminance integrated value Yt to which the current target luminance integrated value Yt gradually converges, whereby changes in luminance of an output image become gradual.

Figure 11:
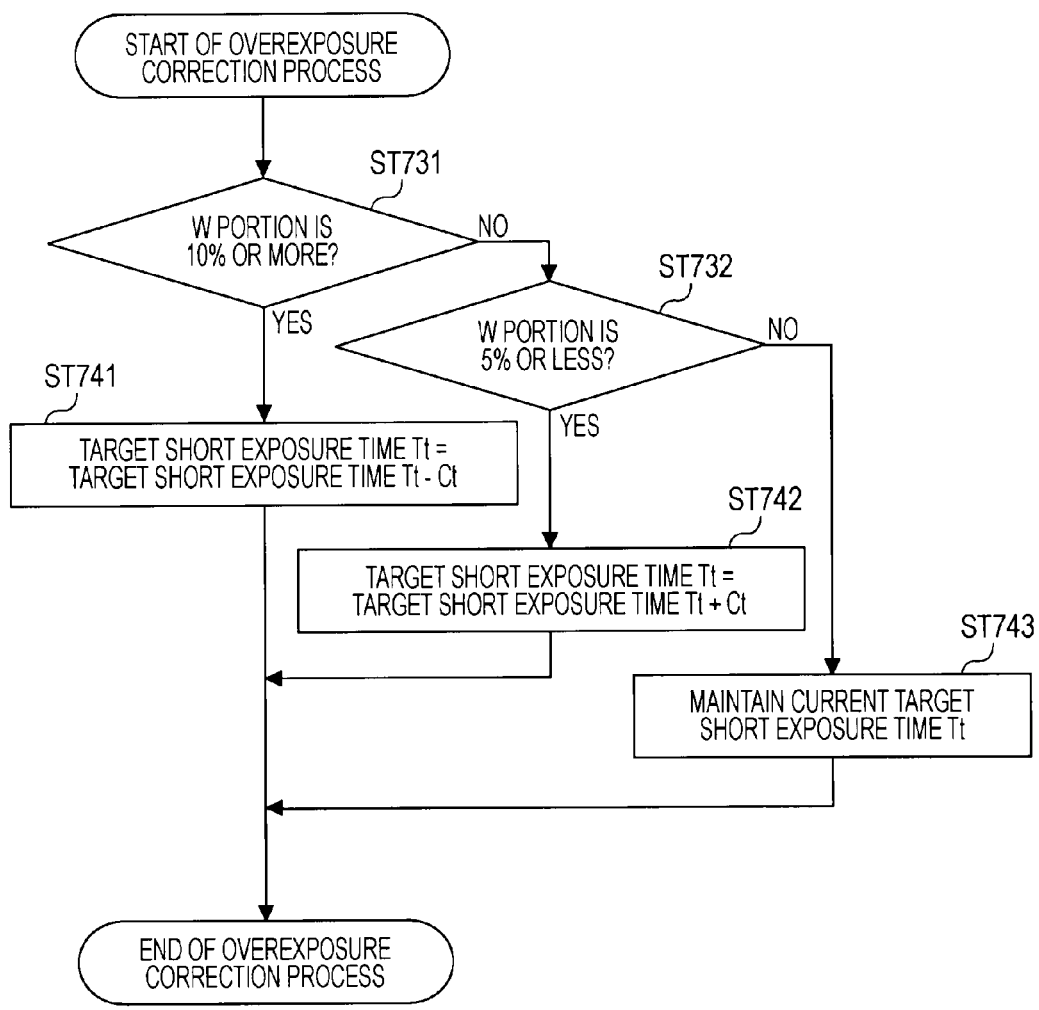
FIG. 11 is a flowchart of an overexposure correction process performed in the exposure correction process.

The overexposure correction process in steps ST73 and ST74 is illustrated in the flowchart of FIG. 11. Steps ST731 and ST732 are performed as a process of detecting overexposure in the luminance histogram in step ST73. Steps ST741, ST742, and ST743 are performed as a process of determining the target short exposure time Tt in step ST74.

That is, in step ST731, the control unit 9 determines whether the proportion of the white portion (W) in the luminance histogram is greater than or equal to 10%. When the proportion is greater than or equal to 10%, it is determined that overexposure is occurring in the combined image signal. In step ST741, the control unit 9 updates the target short exposure time Tt to a value obtained by subtracting a certain fixed value Ct from the current target short exposure time Tt. That is, the control unit 9 updates the target short exposure time Tt to reduce the light quantity of exposure.

When the proportion of the white portion (W) in the luminance histogram is less than 10%, in step ST732, it is determined whether the proportion of the white portion (W) is less than or equal to 5%. When the proportion is less than or equal to 5%, in step ST742, the control unit 9 updates the target short exposure time Tt to a value obtained by adding the fixed value Ct to the current target short exposure time Tt. That is, the control unit 9 updates the target short exposure time Tt to increase the light quantity of exposure.

When it is determined in step ST732 that the proportion is not less than or equal to 5%, that is, when the white portion (W) is within the range between 5% and 10%, it is determined that the light quantity of exposure is appropriate. The flow proceeds to step ST743, and the current target short exposure time Tt is maintained as it is.

The overexposure correction process detects overexposure by checking the proportion of the white portion (W) in the luminance histogram and sets the target short exposure time Tt so that the white portion (W) has a certain proportion. A new target short exposure time Tt is obtained by adding or subtracting the certain value Ct to/from the current target short exposure time Tt. The certain value Ct is added or subtracted to obtain a target short exposure time Tt to which the current target short exposure time Tt gradually converges, whereby changes in luminance of an output image become gradual.

In the foregoing processes, the target luminance integrated value Yt and the target short exposure time Tt are determined. Referring back to FIG. 4, in the exposure correction process in step ST7, as has been described above, exposure control is performed using the target luminance integrated value Yt and the target short exposure time Tt.

By repeating, on a field-period-by-field-period basis, the process which includes the exposure correction process and the exposure control process and which is illustrated in the flowchart of FIG. 4, the combined image signal converges to an exposure state where no underexposure or overexposure is occurring.

As shown in FIGS. 10 and 11, a new target luminance integrated value is set by performing a calculation on the current target luminance integrated value and a fixed value, and a new target short exposure time is set by performing a calculation on the current target short exposure time and a fixed value. Accordingly, the luminance of the combined image signal is adjusted, while changes in the light quantity of exposure become more gradual.

In the exposure control process in step ST8, the control unit 9 performs exposure control using the target luminance integrated value and the target short exposure time determined in the foregoing exposure correction process.

Regarding the light quantity of long exposure corresponding to underexposure, necessary control values for the aperture size of the aperture 1$a$, the long exposure time of the image pickup device unit 2, and the gain of the PGA of the preprocessing unit 3 are calculated on the basis of the difference between the current luminance integrated value received from the detection unit 6 and the new target luminance integrated value set in the foregoing exposure correction process. The optical-component driving unit 8 is caused to drive the aperture 1a. The timing generator 7 is instructed of the long exposure time. The preprocessing unit 3 is instructed of the gain of the PGA. Alternatively, instead of performing all these three control operations, one or two of the three control operations may be performed.

Regarding the light quantity of short exposure corresponding to overexposure, a necessary light quantity of exposure is obtained by instructing the timing generator 7 of the target short exposure time set in the foregoing exposure correction process and changing the target short exposure time of the image pickup device unit 2.

The aperture size of the aperture 1a and the gain of the PGA affect the light quantity of short exposure. However, since the long-exposure image signal is dominant in the combined image, the aperture size of the aperture 1a and the gain of the PGA are used to correct the light quantity of long exposure. Note that the aperture size of the aperture 1a and the gain of the PGA may be used to adjust the light quantity of short exposure.

Figure 12:
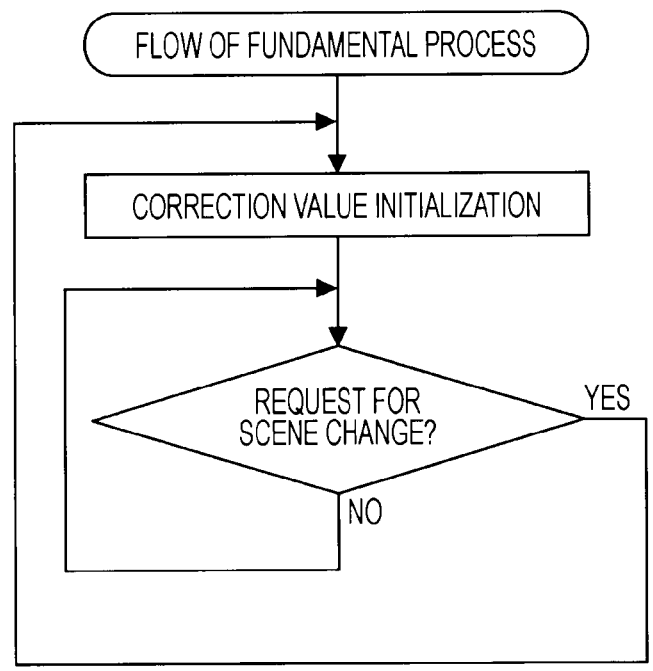
FIG. 12 is a flowchart of a fundamental process performed with the image pickup apparatus.

That is, in the image pickup apparatus 10, as shown in the flowchart of FIG. 12, the control unit 9 performs the foregoing correction value initialization process on the correction values for use in the foregoing exposure correction in response to a signal that triggers a scene change. The control unit 9 detects, as a signal indicating the occurrence of a rotation operation of the image pickup apparatus 10, for example, as shown in part (a) of FIG. 13, a signal indicating the occurrence of a rotation sent from the rotation control unit 15. During a scene change period up to the termination of the rotation operation of the image pickup apparatus 10, the control unit 9 performs the foregoing correction value initialization process once.

Figure 13:
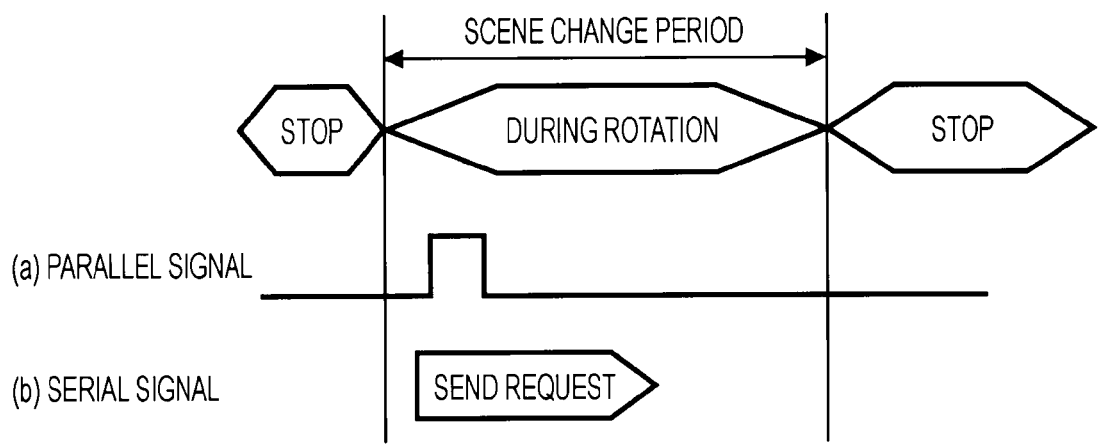
FIG. 13 is a time chart showing exemplary signals sent from a rotation control unit to a control unit of the image pickup apparatus.

Instead of a signal indicating the occurrence of a rotation, as shown in part (b) of FIG. 13, the rotation control unit 15 may send a correction value initialization request once during the rotation operation of the image pickup apparatus 10. In accordance with the initialization request, the control unit 9 may perform the correction value initialization process.

Figure 14:
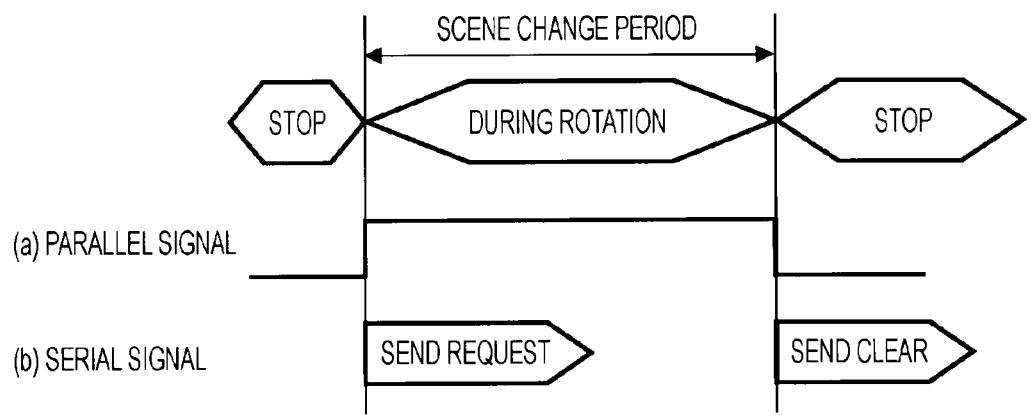
FIG. 14 is a time chart showing other exemplary signals sent from the rotation control unit to the control unit of the image pickup apparatus.

In the foregoing description, in the image pickup apparatus 10, the control unit 9 performs the foregoing correction value initialization process once during a period up to the termination of a rotation operation of the image pickup apparatus 10 in response to a signal indicating the occurrence of a rotation sent from the rotation control unit 15 or a correction value initialization request sent from the rotation control unit 15 only once during the rotation operation of the image pickup apparatus 10. Alternatively, for example, as shown in part (a) of FIG. 14, the rotation control unit 15 may send a signal indicating the occurrence of a rotation operation to the control unit 9. Alternatively, as shown in part (b) of FIG. 14, an initialization request may be sent at the beginning of the rotation operation, and an initialization clearing request may be sent at the end of the rotation operation. During the rotation operation of the image pickup apparatus 10, the foregoing correction value initialization process may be performed.

Figure 15:
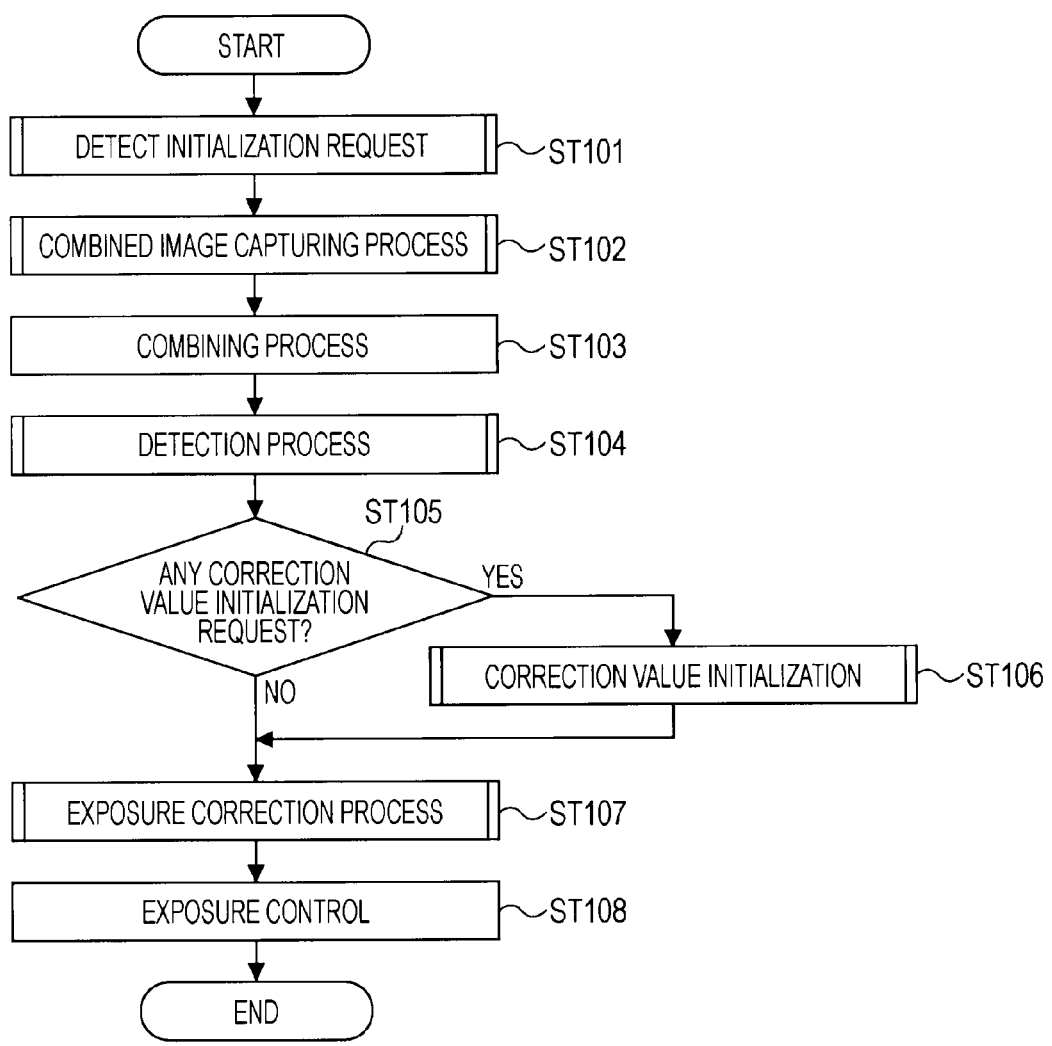
FIG. 15 is a flowchart of another example of the operation of the image pickup apparatus.

In this case, under control of the control unit 9, the image pickup apparatus 10 performs an image capturing operation in accordance with the procedure illustrated in the flowchart of FIG. 15.

That is, when the image capturing operation of the image pickup apparatus 10 starts, the control unit 9 performs an initialization request detecting process in step ST101. Thereafter in step ST102, the control unit 9 performs a combined image capturing process.

Figure 16:
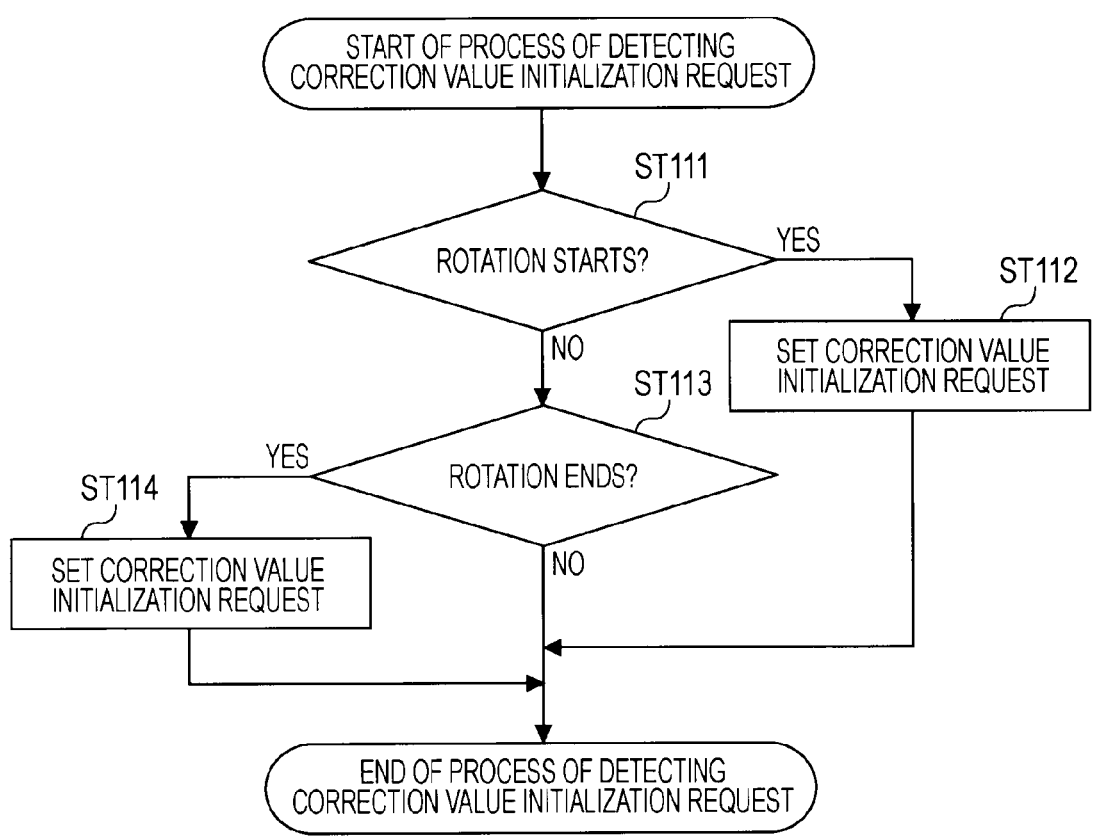
FIG. 16 is a flowchart of a process of detecting a correction value initialization request in another example of the operation of the image pickup apparatus.

The initialization request detecting process in step ST101 is illustrated in the flowchart of FIG. 16. The control unit 9 determines whether a rotation has begun on the basis of a signal indicating that the image pickup apparatus 10 is being rotated or an initialization request, which is supplied from the rotation control unit 15 (step ST111). When the determination result is "yes", that is, when the rotation of the image pickup apparatus 10 has begun, the control unit 9 sets a correction value initialization request (step ST112) and ends the initialization request detecting process. In contrast, when the determination result in step ST111 is "no", that is, when the rotation of the image pickup apparatus 10 has not begun, the control unit 9 determines whether the rotation has ended on the basis of a signal indicating that the image pickup apparatus 10 is being rotated or an initialization clearing request, which is supplied from the rotation control unit 15 (step ST113). When the determination result in step ST113 is "no", that is, when the image pickup apparatus 10 is being rotated, the control unit 9 ends the initialization request detecting process. In contrast, when the determination result in step ST113 is "yes", that is, when the rotation of the image pickup apparatus 10 has ended, the control unit 9 clears the correction value initialization request (step ST114) and ends the initialization request detecting process.

Referring back to FIG. 15, in step ST102, the control unit 9 performs a combined image capturing process similar to that in step ST2.

In step ST103, the control unit 9 performs a combining process similar to that in step ST3.

In step ST104, the control unit 9 performs a detection process using the detection unit 6, which is similar to that in step ST4.

In step ST105, the control unit 9 determines the presence of a correction value initialization request on the basis of the result of the initialization request detecting process in step ST101.

When the determination result in step ST105 is "yes", that is, when there is a correction value initialization request, the control unit 9 performs in step ST106 a correction value initialization process similar to that in step ST6-1 to set correction values for use in exposure correction. In step ST107, the control unit 9 performs an exposure correction process.

In contrast, when the determination result in step ST105 is "no", that is, when there is no correction value initialization request, the flow proceeds to step ST107 without proceeding to step ST106, and the control unit 9 performs an exposure correction process.

In step ST107, the control unit 9 performs an exposure correction process similar to that in step ST7.

In step ST108, the control unit 9 performs an exposure control process similar to that in step ST8.

Figure 17:
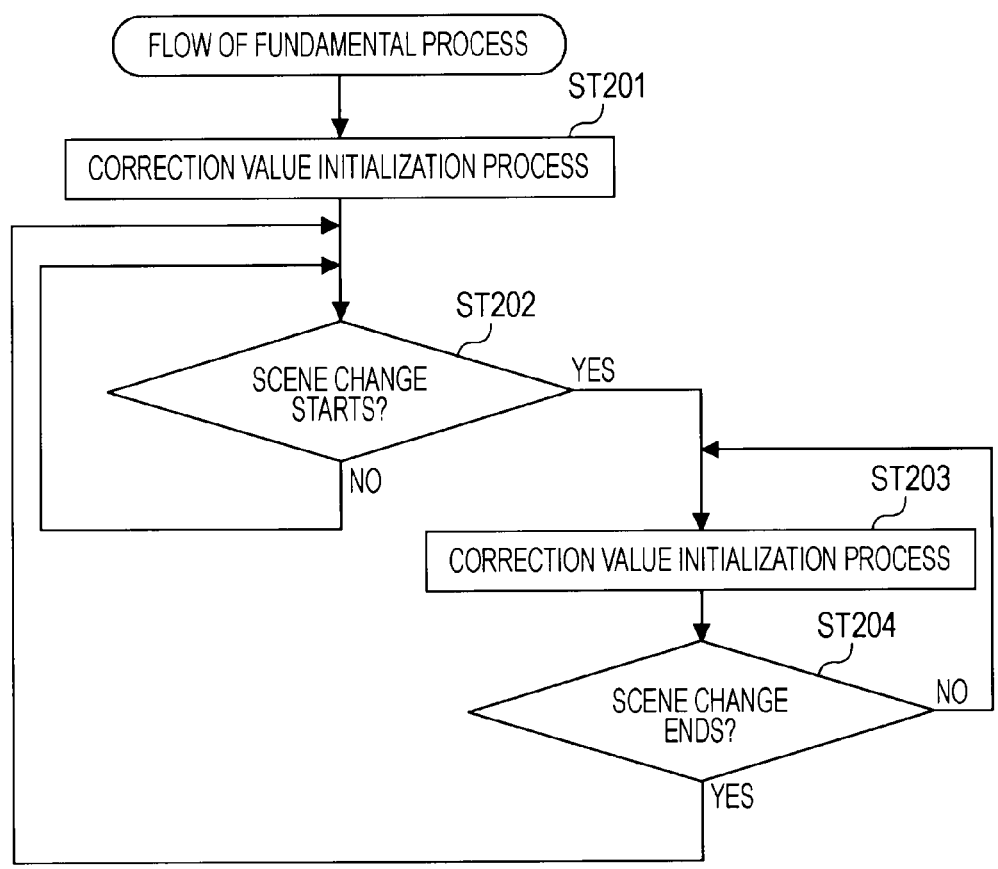
FIG. 17 is a flowchart of a fundamental process performed in the other example of the operation of the image pickup apparatus.

That is, as shown in the flowchart of FIG. 17, the control unit 9 performs a correction value initialization process (step ST201), repeats a process of determining whether a scene change starts (step ST202), performs a correction value initialization process when the scene change starts (step ST203), repeats a process of determining whether the scene change ends (step ST204), and repeats the correction value initialization process until the end of the scene change. When the scene change ends, the flow returns to the foregoing process of determining whether a scene change starts. In this manner, the control unit 9 controls the image capturing operation of the image pickup apparatus 10.

Here, in the examples illustrated in FIGS. 15 and 16, the control unit 9 in the image pickup apparatus 10 determines that a scene change is occurring in accordance with a signal indicating the occurrence of a rotation operation, which is supplied from the rotation control unit 15, initializes the correction values for use in exposure correction during the rotation operation, and performs exposure correction control. Alternatively, the determination of a scene change is not limited to whether a rotation is being performed. Besides a signal indicating the occurrence of a rotation operation, for example, rotation speed information or a zoom operation signal may indicate that a scene change is occurring. That is, when detecting rotation speed information or a zoom operation signal and determining the presence of a correction value initialization request in step ST5 of FIG. 4, the control unit 9 may determine whether a rotation operation at a predetermined speed or higher or a zoom operation is being performed, and, when a rotation operation at a predetermined speed or higher or a zoom operation is being performed, it may be determined that a scene change is occurring. The control unit 9 may initialize the correction values for use in exposure correction in step ST6, and perform exposure correction control.

Alternatively, the control unit 9 may detect a blind open/close signal indicating an opened/closed state of a blind for a window of a place where the image pickup apparatus 10 is located. The control unit 9 may determine that a scene change is occurring when the blind is being opened or closed, initialize the correction values for use in exposure correction, and perform exposure correction control.

Figure 18:
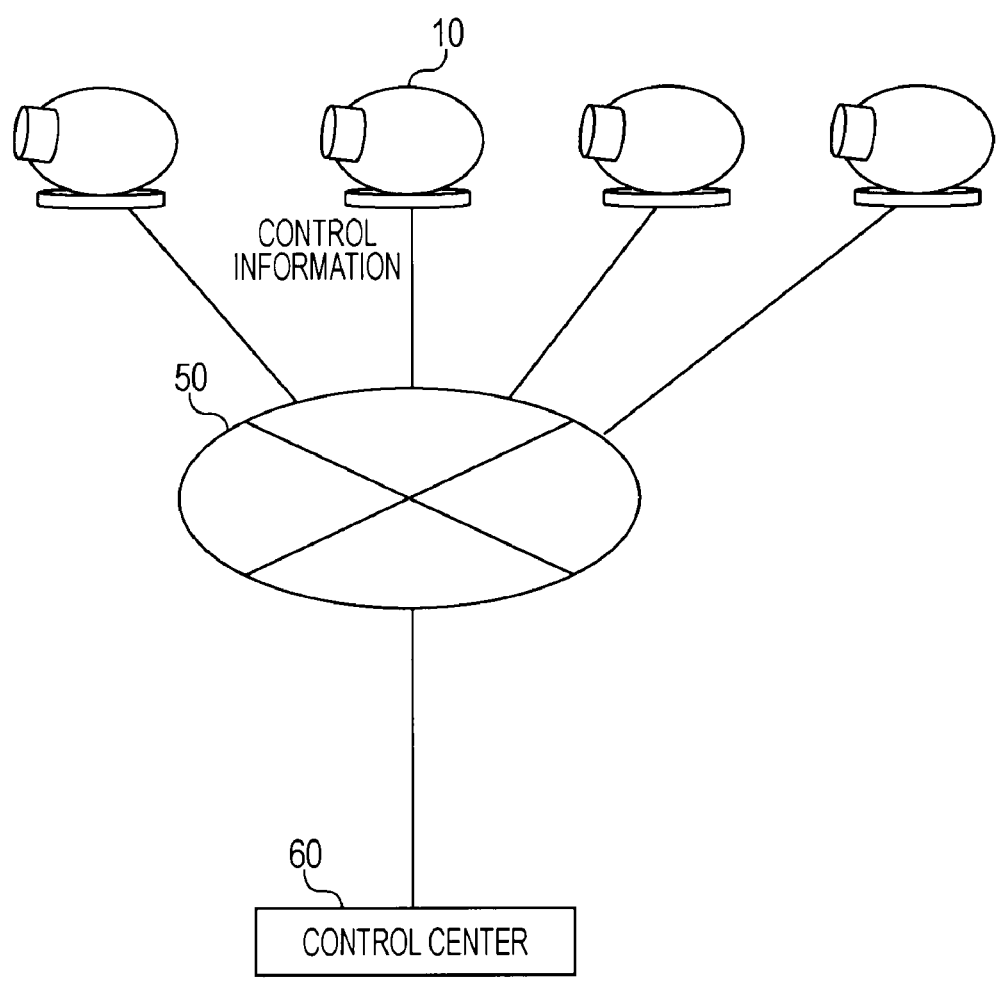
FIG. 18 is an illustration that depicts image pickup apparatuses according to an embodiment of the present invention, which are used as network cameras.
Figure 19:
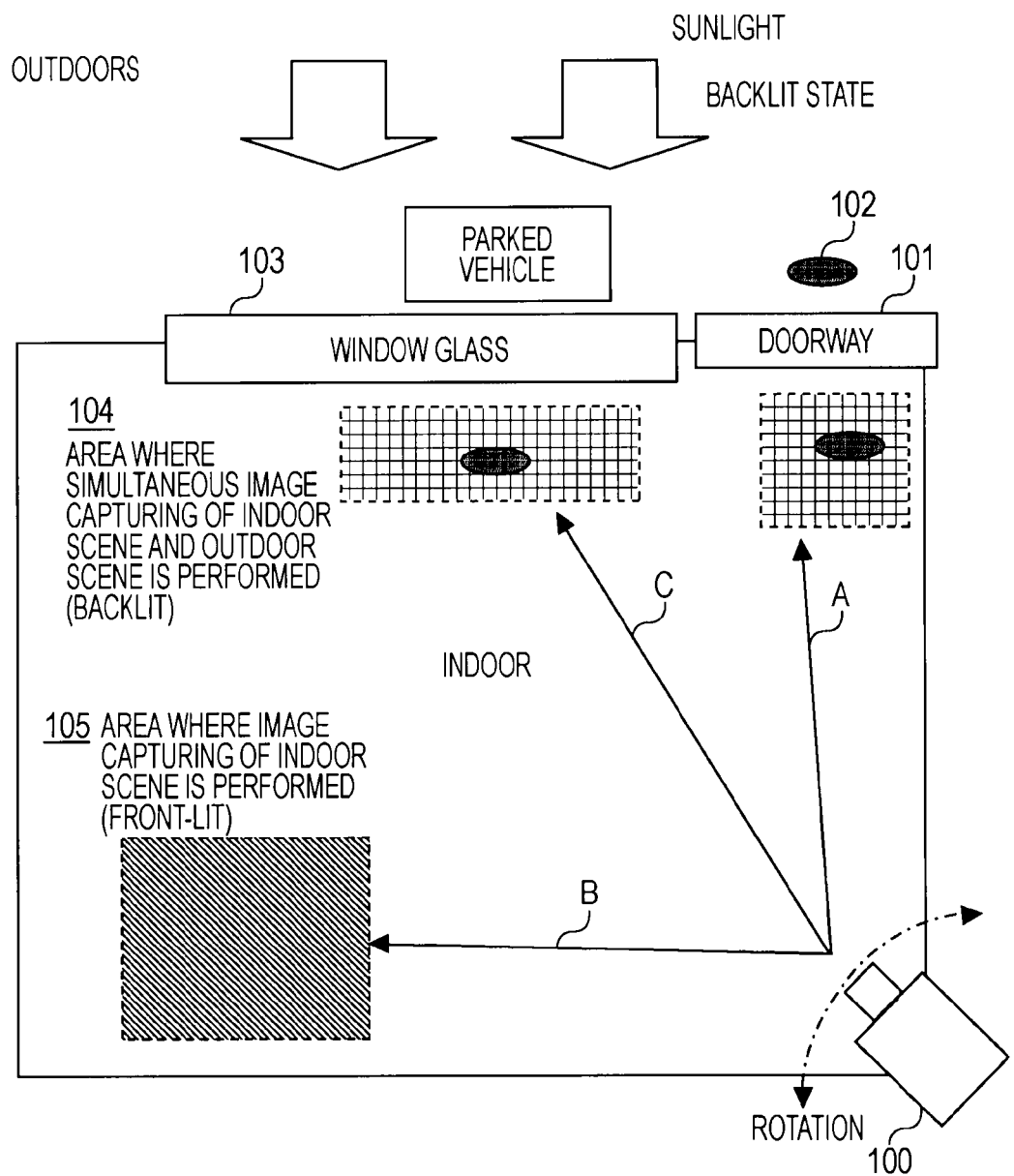
FIG. 19 is an illustration of image capturing states in a monitoring system.

Further, for example, as shown in FIG. 18, when the image pickup apparatus 10 is used as a monitoring network camera whose operation is controlled on the basis of control information sent from a control center 60 via a network 50, the correction values for use in exposure correction may be initialized during a scene change in accordance with control information which indicates a rotation start/end and which is supplied from the control center 60, and may perform exposure correction control.

Further in the image pickup apparatus 10, an image capturing control program according to an embodiment of the present invention is a processing program for the control unit 9, that is, a program for causing the control unit 9, which is a microcomputer (processor), to perform various processes illustrated in FIGS. 4 to 6, 8 to 12, and 15 to 17.

The program can be recorded in advance in a hard disk drive (HDD) serving as a recording medium contained in an apparatus such as a personal computer or an image pickup apparatus or a ROM or flash memory included in a microcomputer with a CPU.

Alternatively, the program can be temporarily or permanently stored (recorded) in a removable recording medium, such as a flexible disk, a compact disc-ROM (CD-ROM), a magneto-optical (MO) disk, a digital versatile disc (DVD), a Blu-ray Disc (registered trademark of the Blu-ray Disc Association), a magnetic disk, a semiconductor memory, or a memory card. Such a removable recording medium can be provided as so-called packaged software.

Besides being installed from a removable recording medium to a personal computer or the like, the program according to the embodiment of the present invention can be downloaded from a download site via a network, such as a local area network (LAN) or the Internet.

The image pickup apparatus 10 has two operation modes, namely, the combined image capturing mode and the normal image capturing mode. The present invention is also applicable to an image pickup apparatus that has no normal image capturing mode and functions only in the combined image capturing mode.

Although the embodiments of the present invention have been described above, various modifications can be made to the present invention.

For example, the present invention is applicable to, besides a camera system that captures moving images, a camera system that captures still images. When still image capturing is performed in a set exposure mode, it is only necessary to perform, for example, the foregoing exposure control (control of the short exposure time) in each field period during a monitoring process up to an image capturing timing.

Alternatively, for example, when image capturing is performed in a non-interlace scanning mode, the foregoing processing in each field period can be regarded as the processing in each frame period.

The unit period of an image signal is not limited to the above-described period in the scanning mode, and various unit periods are conceivable. For example, the unit period may be, for example, a field period, a frame period, a period of a plurality of fields, or a period of a plurality of frames. For example, an exemplary operation is conceivable in which a detection process, an exposure correction process, and an exposure control process are performed once in a plurality of frame periods.

It should be understood by those skilled in the art that various modifications, combinations, sub-combinations, and alterations may occur depending on design requirements and other factors insofar as they are within the scope of the appended claims or the equivalents thereof.

What is claimed is:

1. An image pickup apparatus comprising:
a rotation control unit configured to rotate the image pickup apparatus and to output a signal indicating a rotation of the image pickup apparatus;
an image pickup unit configured to output a long-exposure image signal with a relatively long exposure time and a short-exposure image signal with a relatively short exposure time;
a signal processing unit configured to generate a combined image signal with a relatively wide dynamic range at least wider than that of the long-exposure image signal or that of the short-exposure image signal by combining the long-exposure image signal and the short-exposure image signal;
a detection unit configured to generate a luminance integrated value of the combined image signal; and
a control unit configured to perform exposure correction control using the luminance integrated value and to receive the signal indicating the rotation of the image pickup apparatus from the rotation control unit,
wherein the control unit initializes a correction value for use in the exposure correction control during the rotation of the image pickup apparatus in response to receipt of the signal indicating the rotation of the image pickup apparatus from the rotation control unit.

2. The image pickup apparatus according to claim 1, wherein the detection unit generates the luminance integrated value and a luminance histogram of the combined image signal, and
wherein the control unit performs the exposure correction control using the luminance integrated value and the luminance histogram.

3. The image pickup apparatus according to claim 2, wherein the control unit performs, during the scene change, an initialization process of minimizing a target luminance integrated value, which is a correction value used in performing underexposure correction and which is used in the exposure correction control.

4. The image pickup apparatus according to claim 2, wherein the control unit performs an initialization process of maximizing a target short exposure time, which is a correction value used in performing overexposure correction and which is used in the exposure correction control.

5. The image pickup apparatus according to claim 1, wherein the control unit initializes the correction value for use in the exposure correction control in the case where a change in the luminance integrated value obtained by the detection unit is greater than or equal to a predetermined value.

6. The image pickup apparatus according to claim 1, wherein the rotation control unit outputs a signal to the control unit that indicates an end of the rotation of the image pickup apparatus.

7. An image pickup method comprising:
outputting, by a rotation control unit configured to rotate the image pickup apparatus, a signal indicating a rotation of the image pickup apparatus;
outputting a long-exposure image signal with a relatively long exposure time and a short-exposure image signal with a relatively short exposure time;
generating a combined image signal with a relatively wide dynamic range at least wider than that of the long-exposure image signal or that of the short-exposure image signal by combining the long-exposure image signal and the short-exposure image signal;
generating a luminance integrated value of the combined image signal;
receiving, by a control unit, the signal indicating the rotation of the image pickup apparatus from the rotation control unit; and
performing, by the control unit, exposure correction control using the luminance integrated value,
wherein, in the exposure correction control performing step, a correction value for use in the exposure correction control is initialized during the rotation of the image pickup apparatus in response to receipt of the signal indicating the rotation of the image pickup apparatus from the rotation control unit.

8. The image pickup method according to claim 7, wherein, in the generating step, the luminance integrated value and a luminance histogram of the combined image signal are generated, and
wherein, in the exposure correction control performing step, the exposure correction control is performed using the luminance integrated value and the luminance histogram.

9. The image pickup method according to claim 8, wherein, in the exposure correction control performing step, an initialization process of minimizing a target luminance integrated value, which is a correction value used in performing underexposure correction and which is used in the exposure correction control, is performed during the scene change.

10. The image pickup method according to claim 9, wherein, in the exposure correction control performing step, an initialization process of maximizing a target short exposure time, which is a correction value used in performing overexposure correction and which is used in the exposure correction control, is performed during the scene change.

11. The image pickup method according to claim 8, wherein, in the exposure correction control performing step, the correction value for use in the exposure correction control is initialized when a change in the luminance integrated value obtained in the generating step is greater than or equal to a predetermined value.

12. A non-transitory computer readable storage medium encoded with instruction, which when executed by a computer causes the computer to execute an image pickup method, the image pickup method comprising:
outputting, by a rotation control unit configured to rotate the image pickup apparatus, a signal indicating a rotation of the image pickup apparatus;
outputting a long-exposure image signal with a relatively long exposure time and a short-exposure image signal with a relatively short exposure time;
generating a combined image signal with a relatively wide dynamic range at least wider than that of the long-exposure image signal or that of the short-exposure image signal by combining the long-exposure image signal and the short-exposure image signal;
generating a luminance integrated value of the combined image signal;
receiving, by a control unit, the signal indicating the rotation of the image pickup apparatus from the rotation control unit; and
performing, by the control unit, exposure correction control using the luminance integrated value,
wherein, in the exposure correction control performing step, a correction value for use in the exposure correction control is initialized during the rotation of the image pickup apparatus in response to receipt of the signal indicating the rotation of the image pickup apparatus from the rotation control unit.

* * * * *